United States Patent [19]

Sakai et al.

[11] Patent Number: 4,795,225
[45] Date of Patent: Jan. 3, 1989

[54] SEMICONDUCTOR OPTICAL SWITCH

[75] Inventors: Kazuo Sakai, Tokyo; Yuichi Matsushima, Tanashi; Katsuyuki Utaka, Musashino, all of Japan

[73] Assignee: Kokusai Denshin Denwa Kabushiki Kaisha, Tokyo, Japan

[21] Appl. No.: 143,816

[22] Filed: Jan. 13, 1988

[30] Foreign Application Priority Data

Jan. 19, 1987 [JP] Japan .................................. 62-8199

[51] Int. Cl.⁴ ............................................. G02F 1/015
[52] U.S. Cl. .............................. 350/96.13; 350/96.14; 357/4; 357/30
[58] Field of Search ............... 350/96.11, 96.12, 96.13, 350/96.14, 96.15; 357/4, 4 SL, 30

[56] References Cited

U.S. PATENT DOCUMENTS 4,737,003 4/1988 Matsumura et al. ............. 350/96.14

FOREIGN PATENT DOCUMENTS 60-173519 9/1985 Japan ................................ 350/96.13
60-252329 12/1985 Japan ................................ 350/96.14

OTHER PUBLICATIONS

Wa et al., "All Optical Multiple-Quantum-Well Waveguide Switch," Electronics Lett., vol. 21, No. 1, Jan. 1985, pp. 26-28.
Ishida et al., "InGaAsP/InP Optical Switches Using . . . ", Appl. Phys. Lett., vol. 50, No. 3, Jan. 1987, pp. 141-142.

Primary Examiner—John D. Lee
Attorney, Agent, or Firm—Emmanuel J. Lobato; Robert E. Burns

[57] ABSTRACT

An optical switch is disclosed in which a switching section for switching the optical path of an incident light is formed in a region where two semiconductor optical waveguides cross each other. The switching section is composed of n-, i-, p-, i- and n-type semiconductor layers laminated in that order, each i-type layer being formed by a superlattice layer composed of a plurality of semiconductor thin films so that the i-type layer is higher in the effective refractive index and smaller in the effective energy gap than each n-type layer. The impurity concentrations of the n-, i-, p-, i-, and n-type layers and the thicknesses of the i-, p-, and i-type layers are determined so that the i-, p- and i-type layers are depleted in a thermal equilibrium state.

4 Claims, 5 Drawing Sheets

SEMICONDUCTOR OPTICAL SWITCH

BACKGROUND OF THE INVENTION

The present invention relates to improvement in or relating to a semiconductor optical switch.

Optical switches for switching or turning ON and OFF an optical path through which an optical signal passes are applied to the switching, exchange or optical integration of a wide band optical transmission line and are indispensable to the sophistication of optical communication systems. Of the optical switches, electronic type ones change the course of light by varying the refractive index of the switching section through the application thereto of an electric field or current, and they are divided into the type that utilizes total reflection of light (a total internal reflection type) and the type that utilizes optical coupling between two optical waveguides (a coupled waveguide type).

However, there has not yet been proposed an optical switch of high speed operation and of low absorption loss of incident light.

SUMMARY OF THE INVENTION

An object of the present invention is to provide an optical switch which obviates the above-mentioned defects of the prior art and which is small but capable of high-speed response at a low voltage and causes less absorption loss of incident light.

The characteristic feature of the present invention resides in that the optical switching section, which is a region where waveguides cross each other, is formed by laminating n-, i-, p-, i- and n-type semiconductor layers in that order, that each i-type layer is formed by a superlattice layer so that the i-type layer is higher in the effective refractive index and smaller in the effective energy gap than each n-type layer, and that the thicknesses and impurity concentrations of the i-, p- and i-type layers are selected such that that layers are depleted in a thermal equilibrium state.

BRIEF DESCRIPTION OF THE DRAWINGS

The present invention will be described in detail below in comparison with the prior art with reference to the accompanying drawings, in which.

DETAILED DESCRIPTION

To make differences between prior art and the present invention clear, prior art will first be described.

Figure 1:
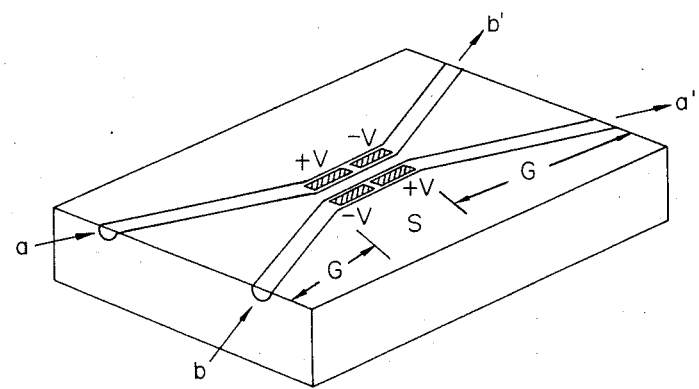
FIG. 1 is a perspective view showing an example of a conventional coupled waveguide type optical switch.
Figure 2:
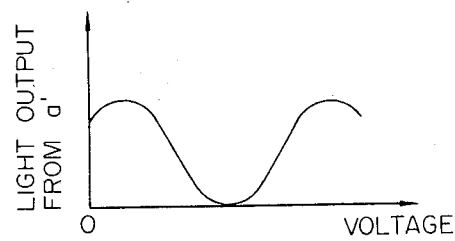
FIG. 2 is a graph showing the output characteristic of the optical switch depicted in FIG. 1.

FIG. 1 is a schematic diagram of a conventional coupled waveguide type optical switch using a dielectric material, G indicating optical waveguide sections and S an optical switching section. When a voltage $+V$ or $-V$ having a polarity as indicated on the drawing is applied across a pair of opposed electrodes, the refractive index of the optical switching section varies with the magnitude of the voltage and the degree of coupling of the waveguides also varies correspondingly. For example, in case of light which enters the optical switch from an inlet a and comes out from an outlet a', the optical output from the outlet a' varies periodically in accordance with an increase in the voltage, as shown in FIG. 2, and the outlet from which the light is emitted can be switched. In this instance, however, inaccurate control of the refractive index will cause incomplete switching, leading to an increase in crosstalk. The refractive index variation with voltage differs according to a temperature change and similar surrounding conditions. This refractive index control is very difficult.

On the other hand, in case of the total internal reflection type optical switch, since a refractive index variation greater than a prescribed value will ensure complete switching, an appreciably wide range of variation is allowed for the voltage which is applied to the optical switch; therefore, the total internal reflection type optical switch is advantageous in practical use. However, the total reflection of light calls for a large refractive index variation on the order of $10^{-3}$ in terms of a relative value, so that even if a dielectric material of great refractive index variation is employed, a voltage close to 100 volts will be needed, presenting a problem in practical use.

Figure 3:
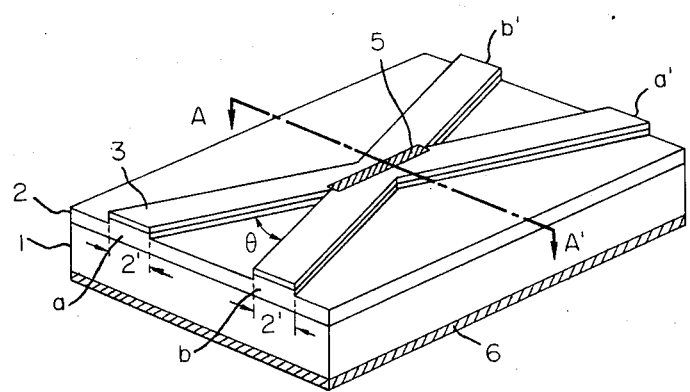
FIG. 3 is a perspective view showing another prior art example in which a switching section is formed in a region where optical waveguides cross each other.
Figure 4:
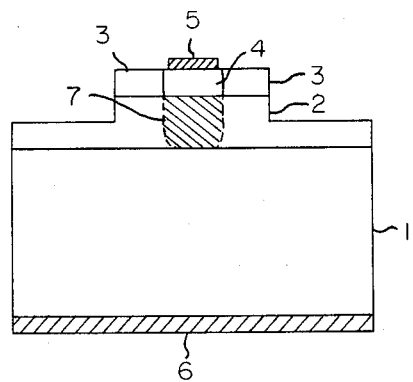
FIG. 4 is a cross-sectional view taken on the line A—A' in FIG. 3.

Recently it has been discovered that the refractive index variation shows a considerable increase by the application of a forward current to a semiconductor pn junction and the storing of carriers (IEEE Journal of quantum Electronics, No. QE-19, Oct. 1983, pp 1525-1430, for example). FIG. 3 shows, in perspective, a switch structure in which a switching section is formed in the intersecting portion of optical waveguides through utilization of this effect. FIG. 4 is a cross-sectional view taken on the line A—A' in FIG. 3 (showing the switching section). In FIG. 4 reference numeral 1 indicates an n+- InP substrate, 2 an n-type $In_{1-x-y}Ga_xAl_yAs$ waveguide layer which is lattice-matched to the InP substrate, 3 an n-type $In_{0.52}Al_{0.48}As$ clad layer, 4 a p+-type $In_{0.52}Al_{0.48}As$ region, 5 a p-side electrode, 6 an n-side electrode, and 7 an refractive index variable region of the waveguide layer 2 in which the refractive index varies in response to the application of voltage across the electrodes 5 and 6. The optical waveguide is the refractive index-guide type utilizing a ridge structure. Now, the operation of this prior art example will be described. Since optical waveguides 2' (regions of the waveguide layer 2 which propagate light therethrough in practice) and the switching section (the region where the optical waveguides 2' cross each other) are formed of a material of the same composition, incident light through inlets a and b travels straight and is emitted through outlets a' and b' when no voltage is being applied across the electrodes 5 and 6. Applying a forward voltage across the electrodes 5 and 6, a current flows mainly through the refractive index variable region 7 directly under the electrode 5. This causes a refractive index variation (a decrease) corresponding to the injected carrier concentration in the region 7, in the vicinity of a wavelength $\lambda_g$ corresponding to its energy gap. Letting the angle of intersection between the two optical waveguides 2' and the relative value of the abovesaid refractive index variation be represented by $\theta$ and $|\Delta n|/n$, respectively, the total reflection of light will occur when the following condition is fulfilled:

$$\theta < 2 \cos^{-1}(1 - |\Delta n|/n) \ldots \quad (1)$$

That is, the incident light through the inlets a and b is subjected to total reflection by the optical switch and is emitted through the outlets b' and a', respectively. According to calculation, in a case where the wavelength $\lambda_g$ in the region 7 is set to 1.51 μm and the injected carrier concentration is $1 \times 10^{18}$ cm$^{-3}$, the relative value $|\Delta n|/n$ is $3.2 \times 10^{-3}$ for a wavelength of 1.55 μm, and a maximum angle permissible for the angle of intersection $\theta$ is as large as 9.1 degrees. This permits the reduction of the size of the switch and the suppression of crosstalk. Yet the use of the pn junction inevitably involves the injection of minority carriers (holes) and consumption of as much time as several tens of nanoseconds after restoration to the initial state after stopping the injection of current. Accordingly, the switch cannot be used for high-speed switching. Furthermore, in case where the switching portion and the waveguide portion are formed of the same material, the switch will cause a large absorption loss of light at a wavelength where the refractive index variation by the current injection is large.

With reference to the accompanying drawings, the invention will hereinafter be described in detail.

Figure 5:
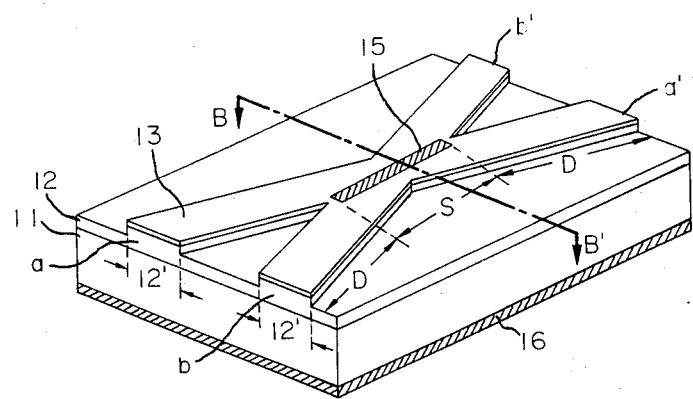
FIG. 5 is a perspective view illustrating an embodiment of the present invention.
Figure 6A:
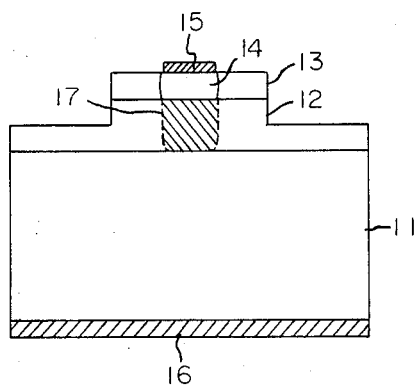
FIGS. 6A and 6B are a cross-sectional view taken on the line B—B' in FIG. 5 and an enlarged cross-sectional view of a waveguide layer of an ultra thin film multilayer structure.
Figure 6B:
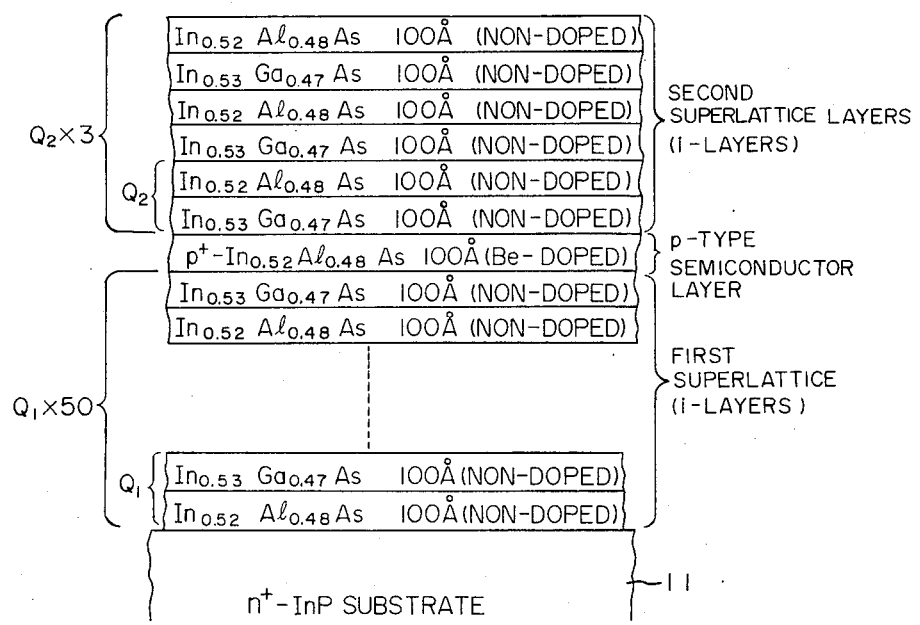
Figure 7:
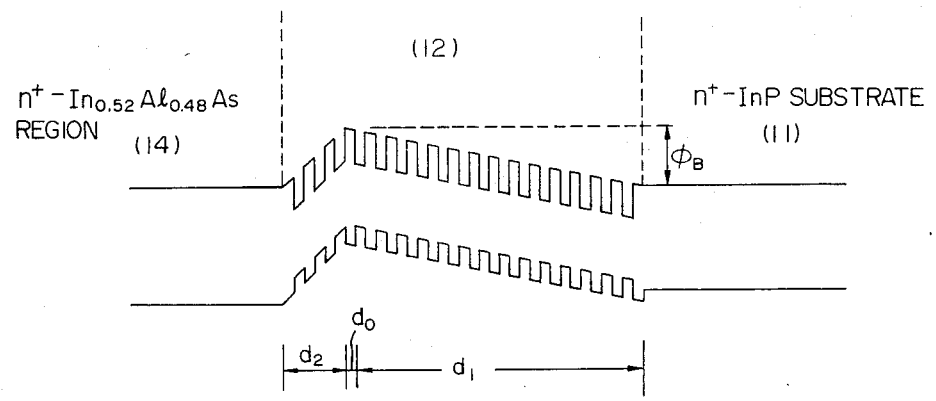
FIG. 7 is a diagram illustrating the energy band of the waveguide layer of the ultra thin film multilayer structure in the embodiment depicted in FIG. 5.

FIG. 5 is a perspective view illustrating an embodiment of the present invention, FIG. 6A a cross-sectional view taken on the line B—B' in FIG. 5, and FIG. 6B an enlarged diagram of a layer 12. Reference numeral 11 indicates an n$^+$-type InP substrate, 12 an i-p-i waveguide layer which is composed of an ultrathin film multilayer structure formed of In$_{0.53}$Ga$_{0.47}$As and In$_{0.52}$Al$_{0.48}$As and is lattice-matched to the InP substrate 11, 13 an undoped In$_{0.52}$Al$_{0.48}$As clad layer, 14 an n$^+$-type In$_{0.52}$Al$_{0.48}$As region, 15 and 16 electrodes, and 17 a refractive index variable region. The waveguide is the refractive index-guide type utilizing the ridge structure. The layer 12 has such a layer structure as shown in an energy band diagram of FIG. 7. That is, as depicted in FIG. 6B, the layer 12 comprises a first i-type layer (hereinafter referred to as a "first superlattice layer") (of a thickness $d_1 = 1$ μm), a p$^+$-type In$_{0.52}$Al$_{0.48}$As layer (of a thickness $d_0 = 100$ Å) doped with Be to a concentration of $10^{18}$ cm$^{-3}$, and a second i-type layer (hereinafter referred to as a "second superlattice layer") (of a thickness $d_2 = 600$ Å). The first superlattice layer is formed by laminating 50 pairs of undoped In$_{0.52}$Al$_{0.48}$As and undoped In$_{0.53}$Ga$_{0.47}$As layers (each having a thickness of 100 Å) (Q$_1$) on the InP substrate 11. The second superlattice layer is also formed by laminating three pairs of undoped In$_{0.53}$Ga$_{0.47}$As and undoped In$_{0.52}$Al$_{0.48}$As layers (each having a thickness of 100 Å) (Q$_2$) on the p-type semiconductor layer. Incidentally, the undoped In$_{0.53}$Ga$_{0.47}$As layers and the undoped In$_{0.52}$Al$_{0.48}$As layers, which form the first and second superlattice layers each have a carrier concentration lower than $10^{15}$ cm$^{-3}$.

With such an arrangement, the switching section has an n(substrate 11)-i(first superlattice layer)-p(p-type semiconductor layer)-i(second superlattice layer)-n(layer 14) structure. What is important here is that the thickness and impurity concentration of each layer forming the i-p-i structure are determined so that the waveguide layer 12 (i-p-i) is depleted when no external energy such as a voltage is being applied to the switching section S (i.e. in a thermal equilibrium state). This is intended to increase the response speed by permitting only majority carriers (electrons) to contribute to a current flow but inhibiting minority carriers (holes) when a voltage is applied to the switching section. That is, when the i-p-i region of the n-i-p-i-n structure is depleted, electrons are confined to the both n-type layers even if a voltage is applied to the switching region, so that only majority carriers contribute to a current flow. In this case, however, if the p-type semiconductor layer of the waveguide layer 12 is too thick, holes present therein cannot be neglected either, and accordingly, the thickness of the p-type layer must be suitably selected.

The afore-mentioned thickness and impurity concentration of each layer are given by way of example. According to the inventors' experience, the depletion of the i-p-i region can be achieved by suitably selecting the thickness and impurity concentration of each of the thin films forming the first and second superlattice layers to be 300 Å or less and $10^{16}$ cm$^{-3}$ or less, respectively, and the thickness and impurity concentration of the p-type semiconductor layer to be 500 Å or less and $10^{17}$ cm$^{-3}$ or more and by selecting the impurity concentrations of the n-type layers (substrate 11 and layer 14) to be $10^{17}$ cm$^{-3}$ or more. In this instance, however, the thicknesses of the n-type layers need not be limited.

Next, a description will be given of how the refractive index varies in the refractive index variable region 17, depending on whether or not voltage is applied to the switching section S.

When no forward voltage is applied across the electrodes 15 and 16, since the refractive index of the refractive index variable region 17 undergoes no change, incident light travels straight. When a forward voltage is applied to the switching section, the refractive index of the refractive index region 17 decreases and total reflection occurs, with the result that the incident light is switched for emission from a different outlet.

When no voltage is applied, the refractive indices of the respective layers in the switching section S are 3.2 for the n$^+$-type InP substrate 11, 3.1 for the n$^+$-type In$_{0.52}$Al$_{0.48}$As region 14, and 3.3 for the first and second superlattice layers of the waveguide layer 12. The refractive indices of the In$_{0.52}$Al$_{0.48}$As and In$_{0.53}$Ga$_{0.47}$As layers forming the first and second superlattice layers are 3.1 and 3.5, respectively; but, by laminating these thin films (each having a thickness of 100 Å, for example) into the multilayer structure, the effective refractive index of the waveguide layer 12 becomes 3.3 at a wavelength of 1.51 μm. Since the effective refractive index of the waveguide layer 12 is larger than that of each n-type layer, incident light is confined within the waveguide layer 12, and since the refractive index of the refractive index variable region 17 remains unchanged, the incident light travels straight.

When a forward voltage is applied across the electrodes 15 and 16, the refractive index of the refractive index variable region 17 of the superlattice structure decreases substantially; and so that the incident light undergoes total reflection in the region 17 and is then emitted from a different outlet. Now a description will be given of the reason for which the refractive index of the refractive index variable region 17 of the superlattice structure in the present invention shows a far greater decrease than in the conventional pn junction structure.

The p$^+$-In$_{0.52}$Al$_{0.48}$As layer, which is a p-type semiconductor layer, forms a barrier against electrons and the barrier height $\phi_B$ is given as follows:

$$\phi_B = \frac{d_1 d_2}{d_1 + d_2} \cdot \frac{qN_A d_0}{\epsilon_s \cdot \epsilon_0} \quad (2)$$

In the above, $N_A$ is the impurity concentration of the p$^+$-type In$_{0.52}$Al$_{0.48}$Al layer, $\epsilon_s$ is the mean specific inductivity of the layer 12, and $\epsilon_0$ is a dielectric constant in vacuum. For instance, if $\epsilon_s = 12$, then $\phi_B \delta 0.85$ eV.

Now, let it be assumed that the electrode 15 is positive relative to the electrode 16. In this instance, as a voltage increases, electrons are injected into the first superlattice layer directly contiguous to the substrate 11, but owing to the presence of the energy barrier by the p$^+$-type In$_{0.52}$Al$_{0.48}$As layer, the electron concentration in the first superlattice layer increases. This varies the dielectric polarization component of the refractive index, causing a decrease in the refractive index. A refractive index change in a so-called quantum well of a small energy gap in the superlattice can be obtained by the use of a density matrix method. That is, a refractive index component n$_d$ resulting from dielectric polarization is given as follows:

$$n_d = \frac{1}{2n \cdot \epsilon_0} \int_{E_g}^{\infty} g(E_{nm}) \cdot R_e(x^{(1)}) dE_{nm} \quad (3)$$

Figure 8:
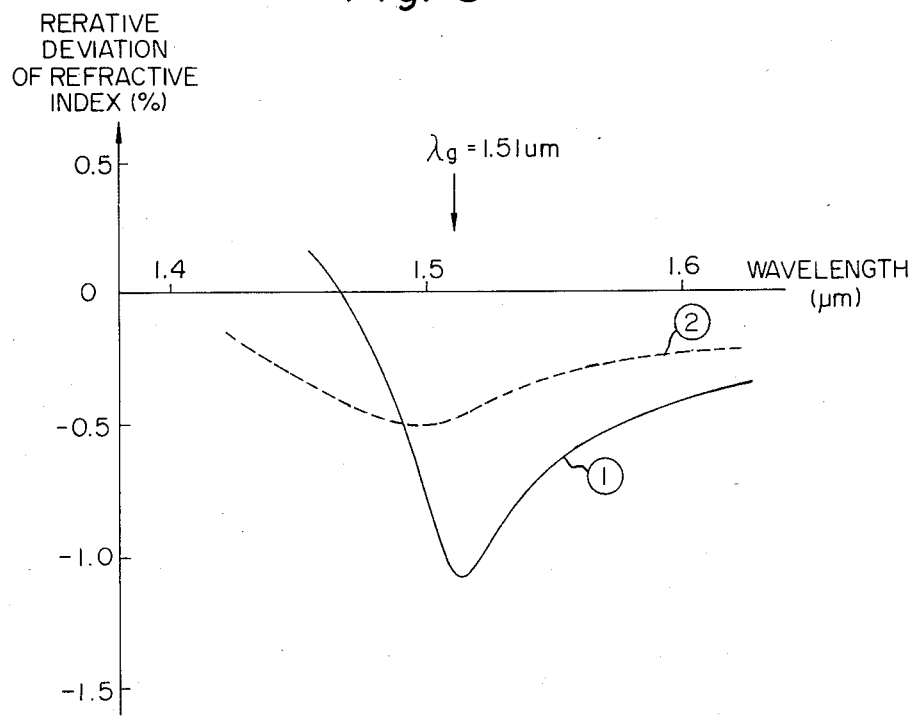
FIG. 8 is a graph showing the wavelength dependence of a relative refractive index variation of a quantum well in the superlattice for use in the present invention.

(See Japanese Journal of Applied Physics, No. 20, July, 1981, pp 1279–1288, for example.) In the above, n is the refractive index, $E_{nm}$ is the energy difference between the conduction band and the valence band, $E_g$ is the energy gap, $g(E_{nm})$ is the state density taking into account both of the conduction band and the valence band, and $R_e(x^{(1)})$ is the real part of the susceptibility. FIG. 8 shows the wavelength dependence, obtained by the use of Eq. (3), of the relative variation of the refractive index ($\Delta n/n \simeq \Delta n_d/n$) by the electron injection. The calculation was performed in a case where the quantum well has a thickness of 100 Å and the injected electron concentration of $1 \times 10^{18}$ cm$^{-3}$. For the purpose of comparison, there is also shown the relative variation of the refractive index in a case where a pn junction was formed in an In$_{1-x-y}$Ga$_x$Al$_y$As layer which had substantially the same energy gap as the effective energy gap (0.82 eV) of the first superlattice layer and was lattice-matched to InP (corresponding to the prior art example depicted in FIGS. 3 and 4).

Incidentally, in the prior art example the injected electron and hole concentrations were both $1 \times 10^{18}$ cm$^{-3}$.

As will be seen from FIG. 8, the electron injection causes a decrease in the refractive index in the vicinity of a wavelength $\lambda_g$ corresponding to the energy gap. For instance, in the prior art example indicated by the broken line (2) the variation is only −0.50% at maximum, whereas in the present invention indicated by the solid line (1) it is as large as −1.08%. Accordingly, the angle of inter-section θ is approximately 16 degrees, permitting the miniaturization of the device as well. Furthermore, at a wavelength of 1.61 μm longer than that $\lambda_g$ by 0.1 μm the relative variation is −0.23% in the prior art example but −0.38% in the present invention. That is, in the same injected carrier concentration the refractive index variation in the present invention is about twice that in the prior art example.

Moreover, according to the present invention, since the waveguide layer 12 has the i-p-i structure as described previously, no minority carriers are injected thereinto. Accordingly, there is no time lag in the response of current and the refractive index variation to the cutting off of the applied voltage. In consequence, the switching of the optical path, for which several tens of nanoseconds are required in the prior art, can be achieved in one nanosecond or less.

Besides, in the superlattice structure according to the present invention the absorption coefficient varies abruptly near the absorption edge, and hence it becomes smaller than in case of a bulk material, at wavelengths a little longer than that $\lambda_g$. This not only reduces the absorption loss in the switching section S but also makes the absorption loss in the optical waveguide smaller than in the prior art example, when a structure of the same composition as the switching section S is adopted.

Since the switching section is irradiated with light of a wavelength nearly equal to that $\lambda_g$, electron-hole pairs are produced by optical absorption, but the use of light of a wavelength longer than that $\lambda_g$ permits sufficient suppression of their generation and enables the optical switch to be designed so that its response speed and crosstalk are free from the influence of such electron-hole pairs.

The crystal growth for the fabrication of the optical switch can easily be achieved through use of molecular beam epitaxy, vapor phase epitaxy, or similar method. The current path can be formed by ion implanation. The prior art can be also employed for the formation of electrodes and the ridge structure, and so forth.

While in the above the ridge structure is employed for the optical waveguide, a buried structure and others which are used for ordinary optical waveguides can be all utilized. In particular, the buried structure can easily be obtained through utilization of the phenomenon that the superlattice becomes disordered by ion implanting or diffusing an impurity into the superlattice structure.

Although the switching section S and the optical waveguide section G have been described to have the same structure, the former may also entirely differ from the latter in composition and in structure.

The optical switching section may also be formed of other mixed crystals such as, for example, a structure in which a waveguide layer of a superlattice structure composed of In$_{0.53}$Ga$_{0.47}$As and InP layers and an InP clad layer are formed on an n$^+$-type InP substrate, or a structure in which a waveguide layer of a superlattice structure composed of GaAs and Ga$_{1-y}$Al$_y$As layers and a Ga$_{1-x}$Al$_x$As clad layer are formed on an n$^+$-type GaAs substrate through an n$^+$-type Ga$_{1-x}$Al$_x$As buffer layer.

As will be appreciated from the foregoing description, according to the present invention, a triangular barrier by the n-i-p-i-n structure is utilized for the injection of only electrons to thereby speed up the response of the optical switch, and a superlattice layer is used for each i-type layer to thereby reduce the injected carrier concentration necessary for switching, i.e. required current therefor, and decrease the absorption loss of the optical switch. Accordingly, the optical switch of the present invention can be used for switching a wide band optical transmission line, and hence can be utilized as an optical switch which is required to be small, light weight and low in power consumption, in a branch circuit of an optical transmission system, an optical switch matrix of a satellite, etc. Accordingly, the present invention is of great utility in practical use.

What we claim is:

1. An optical switch in which a switching section for switching the optical path of an incident light is formed in a region where two semiconductor optical waveguides cross each other, characterized in:

that the switching section is composed of n-, i-, p-, i- and n- type semiconductor layers laminated in that order, each i-type layer being formed by a superlattice layer composed of a plurality of semi-conductor thin films so that the i-type layer is higher in the effective refractive index and smaller in the effective energy gap than each n-type layer; and that the impurity concentrations of the n-, i-, p-, i-and n-type layers and the thicknesses of the i-, p- and i-type layers are determined so that the i-, p- and i-type layers are depleted in a thermal equilibrium state.

2. An optical switch according to claim 1, in which each of said semiconductor thin films forming the superlattice layer has a thickness less than 300 Å and an impurity concentration of less than $10^{16}$ cm$^{-3}$.

3. An optical switch according to claim 1, in which the p-type semiconductor layer has a thickness less than 500 Å and an impurity concentration of more than $10^{17}$ cm$^{-3}$.

4. An optical switch according to claim 1, in which each of said n-type semiconductor layers has an impurity concentration of more than $10^{17}$ cm$^{-3}$.

* * * * *